United States Patent
Rekow

(10) Patent No.: US 10,254,765 B2
(45) Date of Patent: Apr. 9, 2019

(54) COORDINATION OF VEHICLE MOVEMENT IN A FIELD

(71) Applicant: Deere & Company, Moline, IL (US)

(72) Inventor: Andrew Karl Wilhelm Rekow, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 594 days.

(21) Appl. No.: 14/284,653

(22) Filed: May 22, 2014

(65) Prior Publication Data
US 2014/0257619 A1  Sep. 11, 2014

Related U.S. Application Data

(63) Continuation of application No. 12/617,229, filed on Nov. 12, 2009, now Pat. No. 8,738,238.

(51) Int. Cl.
*G05D 1/02* (2006.01)
*A01D 41/127* (2006.01)

(52) U.S. Cl.
CPC ....... *G05D 1/0295* (2013.01); *A01D 41/1278* (2013.01); *G05D 1/0219* (2013.01); *G05D 1/0291* (2013.01); *G05D 1/0297* (2013.01); *G05D 2201/0201* (2013.01)

(58) Field of Classification Search
CPC combination set(s) only.
See application file for complete search history.

(56) References Cited

U.S. PATENT DOCUMENTS

| | | | |
|---|---|---|---|
| 5,646,844 A | 7/1997 | Gudat et al. | |
| 6,205,381 B1 | 3/2001 | Motz et al. | |
| 6,694,260 B1 | 2/2004 | Rekow | |
| 6,732,024 B2 | 5/2004 | Rekow et al. | |
| 6,789,014 B1 | 9/2004 | Rekow et al. | |
| 6,907,336 B2 * | 6/2005 | Gray | A01B 69/008 172/2 |

(Continued)

FOREIGN PATENT DOCUMENTS

| | | |
|---|---|---|
| CN | 1591255 A | 3/2005 |
| EP | 1840690 A2 | 10/2007 |

(Continued)

OTHER PUBLICATIONS

International Search Report, dated Mar. 25, 2011, regarding Application No. PCT/US2010/055898, 2 pages.

(Continued)

*Primary Examiner* — Alicia Torres
(74) *Attorney, Agent, or Firm* — Yee & Associates, P.C.

(57) ABSTRACT

The illustrative embodiments provide for a number of other vehicles that are moved on a number of paths that is substantially parallel to, and offset to at least one of a first offset side and a second offset side of, the path for the first vehicle. The number of other vehicles is moved along at least a portion of the path in the turn in response to a turn in the path of the first vehicle. The number of other vehicles may be moved from the path to a number of second parallel paths that are substantially parallel to the path after the turn of the first vehicle and offset to an opposite offset side of the first vehicle than the at least one offset side before the turn in response to the first vehicle completing the turn.

6 Claims, 10 Drawing Sheets

(56) References Cited

U.S. PATENT DOCUMENTS

| | | |
|---|---|---|
| 7,062,381 B1 | 6/2006 | Rekow et al. |
| 7,155,888 B2 | 1/2007 | Diekhans |
| 7,502,678 B2 | 3/2009 | Diekhans et al. |
| 7,509,199 B2 | 3/2009 | Rekow |
| 7,689,354 B2 | 3/2010 | Heiniger et al. |
| 7,860,628 B2 | 12/2010 | Lange |
| 7,953,526 B2 | 5/2011 | Durkos et al. |
| 8,145,393 B2 | 3/2012 | Foster et al. |
| 8,170,785 B2 | 5/2012 | Diekhans et al. |
| 8,204,654 B2 | 6/2012 | Sachs et al. |
| 8,738,238 B2 | 5/2014 | Rekow |
| 2002/0146347 A1 | 10/2002 | McNeil |
| 2002/0165649 A1 | 11/2002 | Rekow et al. |
| 2003/0145571 A1 | 8/2003 | Diekhans |
| 2005/0055139 A1 | 3/2005 | Tanaka et al. |
| 2006/0282205 A1 | 12/2006 | Lange |
| 2007/0021913 A1 | 1/2007 | Heiniger et al. |
| 2007/0198159 A1 | 8/2007 | Durkos et al. |
| 2007/0233348 A1* | 10/2007 | Diekhans ............ A01B 69/008 701/50 |
| 2007/0233374 A1 | 10/2007 | Diekhans et al. |
| 2007/0255470 A1 | 11/2007 | Diekhans et al. |
| 2009/0240430 A1 | 9/2009 | Sachs et al. |
| 2010/0070145 A1 | 3/2010 | Foster et al. |
| 2011/0112730 A1 | 5/2011 | Rekow |

FOREIGN PATENT DOCUMENTS

| | | |
|---|---|---|
| WO | WO0058800 A1 | 10/2000 |
| WO | WO0125796 A1 | 4/2001 |

OTHER PUBLICATIONS

International Preliminary Report on Patentability, dated May 24, 2012, regarding Application No. PCT/US2010/055898, 7 pages.

Official Action (Inquiry) of Examination of Patentability, National Institute of the Intellectual Property, Republic of Kazakhstan, regarding Application No. 2012/1562.1, dated Dec. 3, 2013, 8 pages.

Extended European Search Report, dated Apr. 16, 2014, regarding Application No. EP10830572.3, 6 pages.

European Patent Office Communication dated Nov. 3, 2015, regarding Application No. EP10830572.3, 4 pages.

State Intellectual Property Office, P.R. China First Office Action, dated Mar. 4, 2014, regarding Application No. 201080051177.4, 18 pages.

* cited by examiner

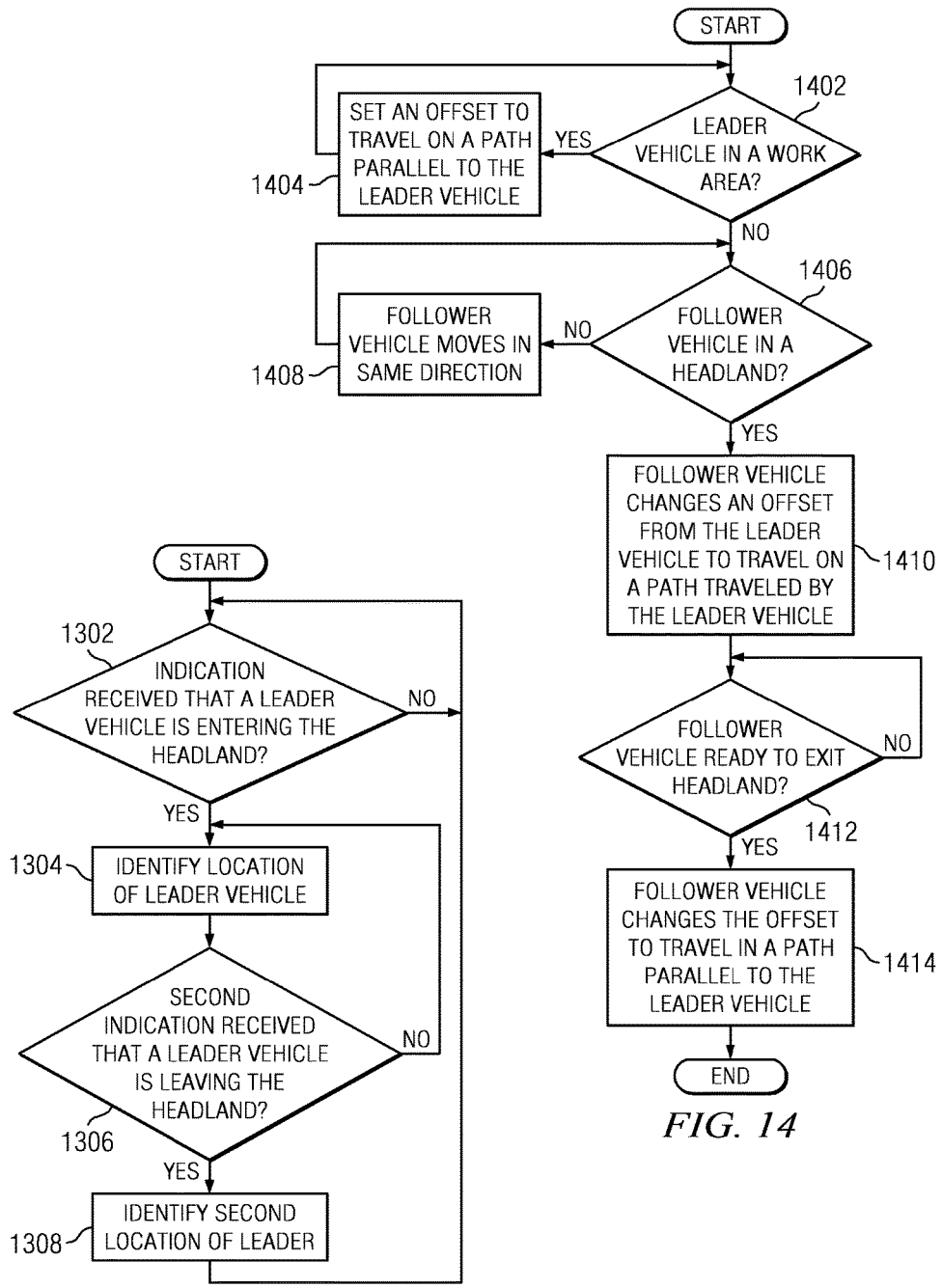

COORDINATION OF VEHICLE MOVEMENT IN A FIELD

CROSS-REFERENCE TO RELATED APPLICATION(S)

This application is a continuation of and claims the benefit of priority to U.S. patent application Ser. No. 12/617,229, filed on Nov. 12, 2009 and entitled "Coordination of Vehicle Movement in a Field", the contents of which are hereby incorporated by reference.

FIELD OF THE INVENTION

The present disclosure relates generally to vehicles, and in particular, to coordinating movement of vehicles. Still more particularly, the present disclosure relates to a method and apparatus for coordinating movement of vehicles in a field.

BACKGROUND OF THE INVENTION

A leader vehicle may be a manned or an unmanned vehicle. In the case of a manned vehicle, an operator may use his or her judgment and perception to guide or navigate the vehicle in its environment. In the case of an unmanned vehicle, a guidance or navigation system may guide or navigate the vehicle in its environment. A number of follower vehicles may track the path of the leader vehicle in a coordinated manner for military, agricultural, or commercial activities.

During operation of the vehicles in an agricultural use, vehicles often travel in straight lines, in rows, and in a field. The vehicles may also travel in curved lines, in curved rows, in the field. The area in which the rows are located is referred to as a "work area" in the field. Instances occur when the vehicles turn or adjust their path. The turning usually occurs in an area of the field called the "headland".

SUMMARY

In an illustrative embodiment, a process begins by moving a first vehicle on a path. A number of other vehicles are moved on a number of paths that is substantially parallel to, and offset to at least one of a first offset side and a second offset side of, the path for the first vehicle. The number of other vehicles is moved along at least a portion of the path in the turn in response to a turn in the path of the first vehicle. The number of other vehicles may be moved from the path to a number of second parallel paths that are substantially parallel to the path after the turn of the first vehicle and offset to an opposite offset side of the first vehicle than the at least one offset side before the turn in response to the first vehicle completing the turn.

In another illustrative embodiment, an apparatus may comprise a first communication interface to a first vehicle for determining a path of the first vehicle, a second communication interface to a number of other vehicles to communicate a number of parallel paths that are substantially parallel to, and offset to at least one of a first and second offset side of, the path for the first vehicle, and control logic for signaling the number of other vehicles through the second communication interface to move along at least a portion of the path in the turn in response to first data indicative of a turn in the path of the first vehicle. The control logic may also signal the number of other vehicles through the second communication interface to move from the path to a number of second parallel paths that are substantially parallel to the path after the turn of the first vehicle, and offset to an opposite side, than the at least one of the offset side before the turn in response to second data indicative of a first vehicle completing the turn.

In yet another illustrative embodiment, the first vehicle may be configured to move on a path. The number of other vehicles may be configured to move on a number of paths that are substantially parallel to the path for the first vehicle. The number of vehicles may also be configured to move along at least a portion of the path in the turn in response to the turn in the path of the first vehicle.

In yet another illustrative embodiment, a follower vehicle travels in a parallel path to the leader vehicle. Then, the process enters a headland. The follower vehicle travels directly in line with, and along the same path as, the leader vehicle while in a portion of the headland.

In yet another illustrative embodiment an apparatus may comprise a leader vehicle and a follower vehicle. The follower vehicle is configured to travel along exactly the same path as the leader vehicle, and further configured to travel in an in-line path to the leader vehicle while in a portion of the headland.

In yet another illustrative embodiment, a first vehicle moves on a path. The first vehicle sends a position of the first vehicle and the path of the first vehicle to the number of other vehicles. A number of other vehicles move on a number of paths that are substantially parallel to the path for the first vehicle. The first vehicle sends an indication to follow the path of the first vehicle on the at least the portion of the path in the turn. The number of other vehicles may move along the at least a portion of the path in the turn in response to a turn in the path of the first vehicle.

The features, functions, and advantages can be achieved independently in various illustrative embodiments, or may be combined in yet other illustrative embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and advantages thereof, will best be understood by reference to the following detailed description of an illustrative embodiment when read in conjunction with the accompanying drawings, wherein:

FIG. 13 is a flowchart of a process for a number of other vehicle movements in accordance with an illustrative embodiment; and FIG. 14 is a flowchart of a process for managing follower vehicle movement in accordance with an illustrative embodiment.

DESCRIPTION OF THE PREFERRED EMBODIMENT

Figure 1:
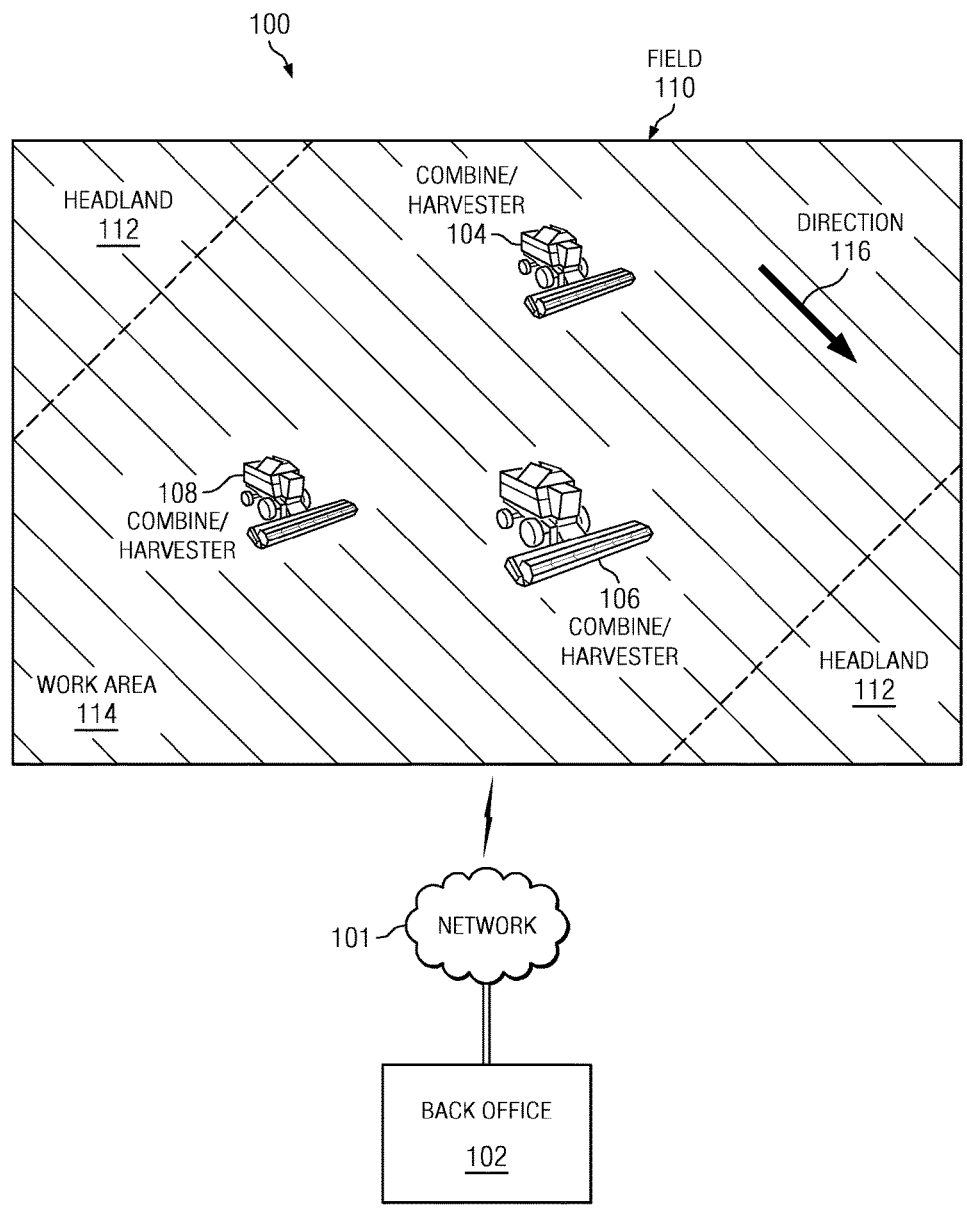
FIG. 1 is a block diagram of multiple vehicles operating in a field environment in accordance with an illustrative embodiment.

The present disclosure relates generally to vehicles, and in particular, to coordinating movement of vehicles. Still more particularly, the present disclosure relates to a method and apparatus for coordinating movement of vehicles in a field.

In one or more illustrative embodiments, the navigation system utilizes a positioning system to determine the location of the one or more vehicles relative to one or more locations, boundaries, and/or to other vehicles. The positioning system implemented is substantially any positioning system including global positioning satellite (GPS) systems, Carrier Phase Differential GPS (CDGPS), code phase differential GPS, triangulation, Laser ranging, optical tracking, long range radio navigation (LORAN), inertial navigation systems, very high frequency omnidirectional ranging (VOR)/Tactical navigational system (TACAN), and substantially any other combination of positioning and/or navigational systems known in the art. The positioning system is utilized to inform the one or more vehicles of their current position, as well as the position of other vehicles.

In one or more illustrative embodiments, the positioning system provides each vehicle with the location of each of the other vehicles operating under the navigation system. In one or more illustrative embodiments, a plurality of positioning systems are utilized, where the plurality of positioning systems communicate with each other to provide positioning information for the vehicles under any one of the positioning systems. In one or more illustrative embodiments, the follower vehicles are operated by an operator with override control to provide safety, reduce errors, and emergency shutoff. The operator may operate the leader vehicle and follower vehicles from inside the vehicles or in another location, such as a back office. In another embodiment, the vehicles may be operated without an operator, such as by a data processing system.

The navigation system utilizes the leader vehicle to provide location parameters such that follower vehicles are capable of positioning themselves relative to the leader vehicle's path. The follower vehicles utilize the parameters to at least determine appropriate steering and speed commands. The leader vehicle is capable of being manually or automatically operated. When operating manually, a vehicle operator determines the path or course of the leader vehicle either by directly sitting at the controls of the vehicle or by remote control. When automatically operating, the leader vehicle is programmed, given a predefined path in which to follow, or is itself following another vehicle, and through the positioning and navigational system, the leader vehicle automatically implements the path without additional intervention from an operator.

In one or more illustrative embodiments, the follower vehicle's function is based on the parameters provided by the leader vehicle regardless of whether the leader vehicle is operated manually or automatically. In one illustrative embodiment, leader and/or follower vehicles include displays which display the location of one or more of the vehicles. The display is further capable of showing the area being navigated, areas already navigated by previous vehicles, such as areas already harvested, boundaries, obstacles, and other such information.

With reference to the figures, and in particular, with reference to FIG. 1, embodiments of the present invention may be used in a variety of vehicles, such as automobiles, trucks, harvesters, combines, agricultural equipment, tractors, mowers, armored vehicles, landmine clearing vehicles, utility vehicles, or any other vehicles intended to provide coverage of a specific land area. The variety of vehicles may include a leader vehicle and follower vehicles. The leader vehicle and follower vehicles may be of the same or different types of vehicles. Embodiments of the present invention may also be used in a single computing system or a distributed computing system. The illustrative embodiments are not meant to limit the present invention in any way.

FIG. 1 depicts a block diagram of multiple vehicles operating in a network environment in accordance with an illustrative embodiment. FIG. 1 depicts an illustrative environment including network 101 in one illustrative embodiment. In this example, back office 102 may be a single computer or a distributed computing cloud. Back office 102 supports the physical databases and/or connections to external databases which underlie the knowledge bases used in the different illustrative embodiments. Back office 102 may supply knowledge bases to different vehicles, as well as provide online access to information from knowledge bases. In this example, combine/harvesters 104, 106, and 108 may be any type of harvesting, threshing, crop cleaning, or other agricultural vehicle. In this illustrative embodiment, combine/harvesters 104, 106, and 108 operate on field 110, which may be any type of land used to cultivate crops for agricultural purposes.

In this depicted example, field 110 has headland 112 and work area 114. Headland 112 normally has a lower yield of crops than work area 114. Also, headland 112 may have more traffic as it may be used to make turns.

In an illustrative example, combine/harvesters 104 and 108 may move in field 110 following a leader using a number of different modes of operation to aid an operator in performing agricultural tasks on field 110. Combine/harvesters 104, 106, and 108 are traveling in direction 116. A number as used with reference to items means one or more items. For example, a number of different modes is one or more different modes. In the illustrative examples, the number of different modes includes, for example, at least one of a side following mode, a teach and playback mode, a teleoperation mode, a path mapping mode, a straight mode, destination point acquisition mode, track and follow mode, a path tracking mode, and other suitable modes of operation.

As used herein the phrase "at least one of" when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C or item B and item C. As another example, at least one of item A, item B, and item C may include item A, two of item B, and 4 of item C or some other combination types of items and/or number of items.

In the different illustrative examples, an operator may be a person being followed as the leader when the vehicle is operating in a side-following mode, a person driving the vehicle, or a person controlling the vehicle movements in teleoperation mode. A leader may be a human operator or another vehicle in the same worksite.

In one example, in the side following mode, combine/harvester 106 is the leader and combine/harvesters 104 and 108 are the followers. The side following mode may include preprogrammed maneuvers in which an operator may change the movement of combine/harvester 106 from an otherwise straight travel path for combine/harvester 106. For example, if an obstacle is detected in field 110, the operator may initiate a go-around obstacle maneuver that causes combine/harvester 106 to steer out and around an obstacle in a preset path.

In a teach and play back mode, an operator may manually drive combine/harvester 106 along a path on field 110 without stops, generating a mapped path. After driving the path, the operator may move combine/harvester 106 back to the beginning of the mapped path. The mapped path may be used as a path of a leader vehicle. After the path of the leader vehicle is mapped, follower vehicles, such as combine/harvesters 104 and 108, travel along paths based on the mapped path of the leader vehicle.

In a teleoperation mode, for example, an operator may operate and/or wirelessly drive combine/harvester 106 across field 110 in a fashion similar to other remote controlled vehicles. With this type of mode of operation, the operator may control combine/harvester 106 through a wireless controller.

In a path mapping mode, the different paths may be mapped by an operator prior to reaching field 110. In a crop spraying example, routes may be identical for each trip, and the operator may rely on the fact that combine/harvester 106 will move along the same path each time. Intervention or deviation from the mapped path may occur only when an obstacle is present. Again, with the path mapping mode, way points may be set to allow combine/harvester 106 to stop or turn at certain points along field 110.

In a straight mode, combine/harvester 106 may be placed in the middle or offset from some distance from a boundary, field edge, or other vehicle on field 110. In a grain harvesting example, combine/harvester 106 may move down field 110 along a straight line allowing one or more other vehicles, such as combine/harvester 104 and 108, to travel in a parallel path on either side of combine/harvester 106 to harvest rows of grain. In this type of mode of operation, the path of combine/harvester 106 is always in the middle or offset some distance from the boundary, field edge, or other vehicle on field 110 unless an obstacle is encountered. In this type of mode of operation, an operator may start and stop combine/harvester 106 as needed.

In a destination point acquisition mode, combine/harvester 106 may be the leader vehicle and combine/harvesters 104 and 108 may be the follower vehicles. A follower vehicle may determine its own direction, control, and course to position itself at a desired destination point, where the destination point is dependent upon a location of the leader vehicle. The parameters used to determine the destination point can be based on distances, such as X meters to the left, and Y meters to the right of the leader vehicle; time, such as 10 seconds behind the leader vehicle, a combination, such as X meters to the left and 10 seconds ahead of the leader vehicle, and other such parameters.

In a track and follow mode, combine/harvester 106 may be the leader vehicle, and combine/harvesters 104 and 108 may be the follower vehicles. A follower vehicle maintains a fixed position relative to the position of the leader vehicle. For example, the follower vehicle maintains a desired position such as a fixed position which is X meters behind and Y meters to the right or left of the leader vehicle, or T seconds behind the leader vehicle. As the leader vehicle adjusts its position or turns, the follower vehicle maintains a position which is X meters behind and Y meters to the right.

In the path tracking mode, combine/harvester 106 may be the leader vehicle and combine/harvesters 104 and 108 may be the follower vehicles. The leader vehicle initially proceeds to generate a first trail, leader trail, or leader path. In one illustrative embodiment, the leader path is generated based on periodic time measurements, such that the location of the leader vehicle is recorded every "T" time intervals. In one illustrative embodiment, the leader path is generated on periodic distance measurements, such that the location of the leader vehicle is recorded every predefined distance. Once the leader path generation is initiated, one or more follower vehicles are capable of generating or calculating one or more follower paths which are offset from the leader path.

In different illustrative embodiments, the different types of modes of operation may be used in combination to achieve the desired goals. In these examples, at least one of these modes of operation may be used to control vehicle movement in a harvesting process. In these examples, each of the different types of vehicles depicted may utilize each of the different types of modes of operation to achieve the desired goals.

Further, autonomous routes may include several line segments. In other examples, a path may go around blocks in a square or rectangular pattern or follow field contours or boundaries. Of course, other types of patterns also may be used depending upon the particular implementation. Routes and patterns may be performed with the aid of a knowledge base in accordance with an illustrative embodiment. In these examples, an operator may drive combine/harvester 104 onto a field or to a beginning position of a path. The operator also may monitor combine/harvester 104 for safe operation and ultimately provide overriding control for the behavior of combine/harvester 104.

In these examples, a path may be a preset path, a path that is continuously planned with changes made by combine/harvester 104 to follow a leader in a side following mode, a path that is directed by an operator using a remote control in a teleoperation mode, or some other path. The path may be any length depending on the implementation. Paths may be stored and accessed with the aid of a knowledge base in accordance with an illustrative embodiment.

Thus, the different illustrative embodiments provide a number of different modes to operate a number of different vehicles, such as combine/harvesters 104, 106, and 108. Although FIG. 1 illustrates a vehicle for agricultural work, this illustration is not meant to limit the manner in which different modes may be applied. For example, the different illustrative embodiments may be applied to other types of vehicles and other types of uses.

The different illustrative embodiments recognize and take into account that currently, when a leader vehicle makes a 180 degree turn, a follower vehicle will maintain an offset, a parallel path, to the leader vehicle, causing the headland area to be larger than desired. For example, if field 110 has a fixed area, an increase in the size of headland 112 reduces the size of work area 114. In many cases, the crop yield in headland 112 may be non-existent or lower than work 114. Thus, an increase in headland 112 reduces the crop yield for field 110. The different advantageous embodiments recognize and take into account that reducing the size of headland 112 is desirable.

The different illustrative embodiments also recognize and take into account with currently used vehicles, when a leader vehicle enters into a headland, the follower vehicles enter the headland and maintain an offset, or parallel path. Therefore, the headland may need to be as wide as the width of the implementation of all the vehicles.

The different illustrative embodiments recognize and take into account that when a leader vehicle maneuvers or turns into a headland, the follower vehicles maintain an offset, or parallel path. Therefore, when the leader vehicle is making a tight turn, the follower vehicles on the inside of the turn may need to make even tighter turns which the follower vehicles may not be able to perform.

Thus, the different illustrative embodiments recognize and take into account that it would be advantageous to have a method and apparatus, which takes into account one or more of the issues discussed above as well as possibly other issues.

In an illustrative embodiment, a process begins by moving a first vehicle on a path. A number of other vehicles are moved on a number of paths that is substantially parallel to, and offset to at least one of a first offset side and a second offset side of, the path for the first vehicle. The number of other vehicles is moved along at least a portion of the path in the turn in response to a turn in the path of the first vehicle. The number of other vehicles may be moved from the path to a number of second parallel paths that are substantially parallel to the path after the turn of the first vehicle and offset to an opposite offset side of the first vehicle than the at least one offset side before the turn in response to the first vehicle completing the turn.

In another illustrative embodiment, an apparatus may comprise a first communication interface to a first vehicle for determining a path of the first vehicle, a second communication interface to a number of other vehicles to communicate a number of parallel paths that are substantially parallel to, and offset to at least one of a first and second offset side of, the path for the first vehicle, and control logic for signaling the number of other vehicles through the second communication interface to move along at least a portion of the path in the turn in response to first data indicative of a turn in the path of the first vehicle. The control logic may also signals the number of other vehicles through the second communication interface to move from the path to a number of second parallel paths that are substantially parallel to the path after the turn of the first vehicle, and offset to an opposite side, than the at least one of the offset side before the turn in response to second data indicative of a first vehicle completing the turn.

In yet another illustrative embodiment, a follower vehicle travels in a parallel path to the leader vehicle. Then, the process enters a headland. The follower vehicle travels directly in line with, and along the same path as, the leader vehicle while in a portion of the headland.

In yet another illustrative embodiment an apparatus may comprise a leader vehicle and a follower vehicle. The follower vehicle is configured to travel along exactly the same path as the leader vehicle, and further configured to travel in an in-line path to the leader vehicle while in a portion of the headland.

In yet another illustrative embodiment, a first vehicle moves on a path. The first vehicle sends a position of the first vehicle and the path of the first vehicle to the number of other vehicles. A number of other vehicles move on a number of paths that are substantially parallel to the path for the first vehicle. The first vehicle sends an indication to follow the path of the first vehicle on the at least the portion of the path in the turn. The number of other vehicles may move along the at least a portion of the path in the turn in response to a turn in the path of the first vehicle.

As used herein, "in-line" is defined as a portion of a path or turn of a path in which leader and follower vehicles all take the same path, paths co-incident to each other, and/or right on top of each other.

Figure 2:
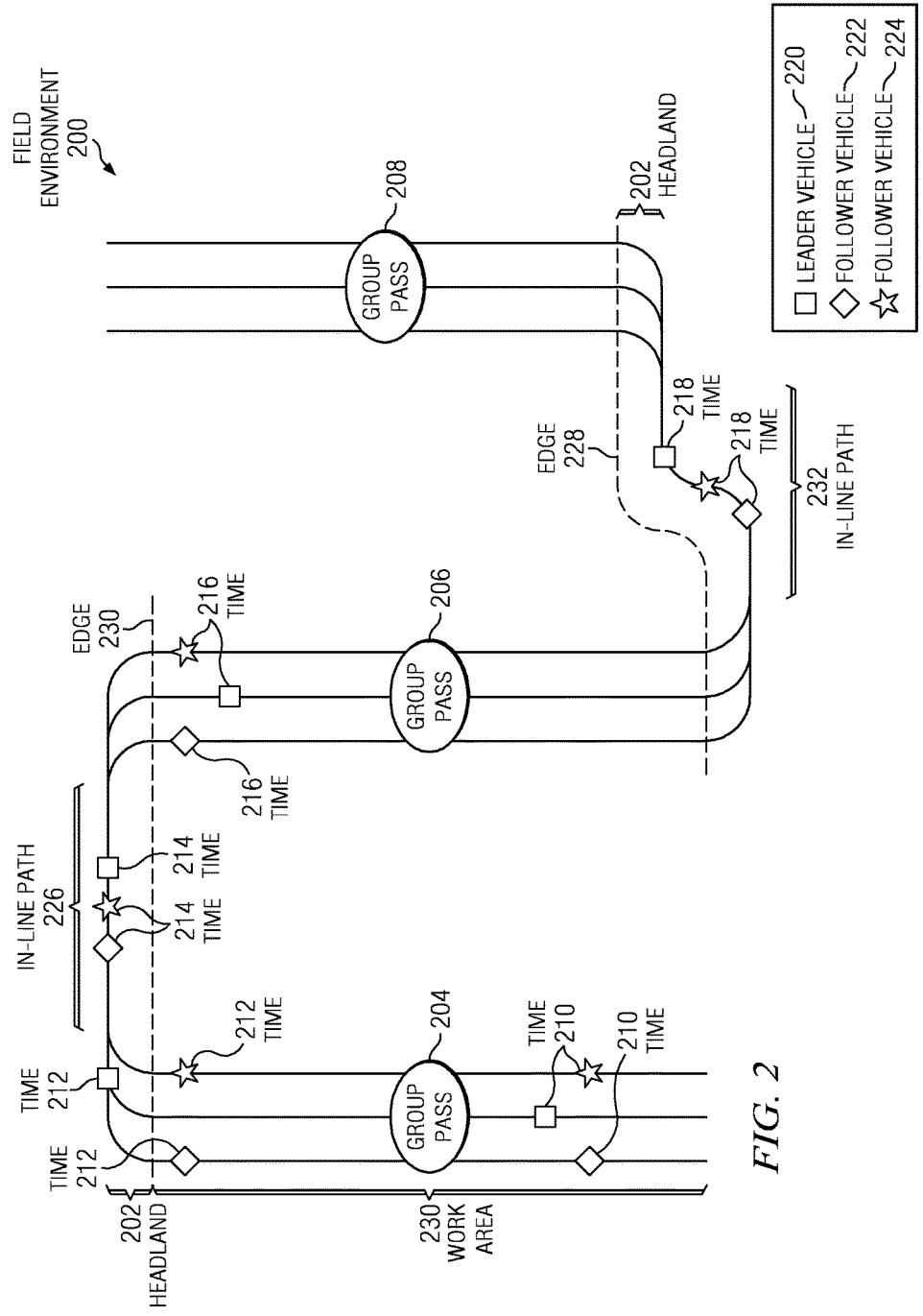
FIG. 2 is a block diagram of one implementation of one illustrative embodiment of a three machine configuration.

Turning now to FIG. 2, a diagram of paths used by three vehicles is depicted in accordance with an illustrative embodiment. In field environment 200, three vehicles make multiple passes on a field while making in-line turns in headland 202. Field environment 200 may be one implementation of one illustrative embodiment of field environment 100 of FIG. 1. Field environment 200 comprises headland 202, group pass 204, 206, and 208, time 210, 212, 214, 216, and 218, leader vehicle 220, and follower vehicles 222 and 224.

Headland 202 may be one implementation of headland 112 of FIG. 1. Leader vehicle 220 may be one implementation of combine/harvester 106 of FIG. 1. Follower vehicle 222 may be one implementation of combine/harvester 104 of FIG. 1. Follower vehicle 224 may be one implementation of combine/harvester 108 of FIG. 1.

In a number of the illustrative embodiments, follower vehicles 222 and 224 move in a staggered formation with respect to leader vehicle 220. In this example of a symmetric chevron formation, follower vehicles 222 and 224 are even with each other, behind, and located parallel to the path of leader vehicle 220 at time 210. In different illustrative embodiments, other types of formations may be used. For example, in a left offset chevron formation, follower vehicle 222 is located behind and parallel to the path of leader vehicle 220 while follower vehicle 224 is parallel to the path of leader vehicle 220 and behind follower vehicle 222. In a right offset chevron formation, follower vehicle 224 is located behind and parallel to the path of leader vehicle 220 while follower vehicle 222 is parallel to the path of leader vehicle 220 and behind follower vehicle 224. In a left or right slant formation, the vehicle furthest ahead would be at the far left or right with the second vehicle being behind and next to the first and the third vehicle being behind and next to the second and so on.

At time 212, leader vehicle 220 enters headland 202. In one or more illustrative embodiments, follower vehicle 224 may slow down to allow leader vehicle 220 to pass. In different illustrative embodiments, follower vehicle 224 may maintain a further distance behind leader vehicle 220 so that follower vehicle 224 would not have to slow down for leader vehicle 220 to pass.

At time 214, follower vehicles 222 and 224 are located in headland 202 and move on in-line path 226 traveled on by leader vehicle 220. The order and/or sequence in which follower vehicles 222 and 224 may enter headland 202 may be controlled differently in different illustrative embodiments. The sequence may be controlled utilizing information such as, but not limited to, the timing, spacing, speed, and travel distance to a corresponding offset for leader vehicle 220 of follower vehicles 222 and 224. For example, in one embodiment, number identifiers may be assigned to follower vehicles 222 and 224 with follower vehicles 222 and 224 going in the order designated by the number identifiers. In another illustrative embodiment, leader vehicle 220 may identify, select, and/or transmit to follower vehicles 222 and 224 the order to enter headland 202. In yet another illustrative embodiment, the order may be determined by which follower vehicle reaches in-line path 226 first. In other illustrative embodiments, other types of ordering arrangements may be performed.

At time 216, leader vehicle 220 and follower vehicles 222 and 224 travel in an opposite direction along group pass 206 in a substantially opposite direction from the direction traveled in group pass 204 and not adjacent to group pass 204. It is recognized that by skipping group passes, two vehicles may not travel in adjacent and in opposite directions. Leader vehicle 220 and follower vehicles 222 and 224 may use headland 202 to move and turn from group pass 204 to group pass 206. A pass is when a combine or harvester travels across the field. A group pass is the path of all of combine/harvesters from one side of the field to the other side.

Additionally, follower vehicles 222 and 224 have switched to opposite sides of leader vehicle 220. The result of switching sides is that each vehicle has skipped two rows. In other illustrative embodiments, four follower vehicles may be present instead of two. When four follower vehicles are present, each vehicle, including leader vehicle 220, skips four rows. If three follower vehicles are used, then each vehicle may skip three rows. Skipping rows allows all vehicles to have a larger turn size. A turn size is the size of a turn any vehicle makes while in headland 202. If the next path or group pass to be traveled by a vehicle is close, the vehicle will make a tighter turn. The further away the next path or group pass, the less tight a turn. For example, if leader vehicle 220 is traveling on a first path and then turns in headland 202 to a path adjacent to the first path, it may be difficult for leader vehicle 220 to make the turn due to turning radius constraints on leader vehicle 220. Skipping rows or paths allows leader vehicle 220 and follower vehicles 222 and 224 the largest size turn all together.

At time 216, leader vehicle 220 and follower vehicles 222 and 224 are in headland 202 heading towards group pass 206. Headland 202 has edge 228. Edge 228 is the boundary between headland 202 and work area 230. Edge 228 of headland 202 at time 216 is one example of an edge of a headland which is not in a straight line as opposed to edge 228 which has a straight line. Headland 202 may be in any shape or size and may be formed around obstacles or field boundaries. When leader vehicle 220 is operated by an operator, the operator may maneuver leader vehicle 220 around an obstacle while indicating that leader vehicle 220 is in headland 202. Therefore, as long as leader vehicle 220 is indicating that leader vehicle 220 is in headland 202, in-line path 232 is used by follower vehicles 222 and 224 to follow.

Figure 3:
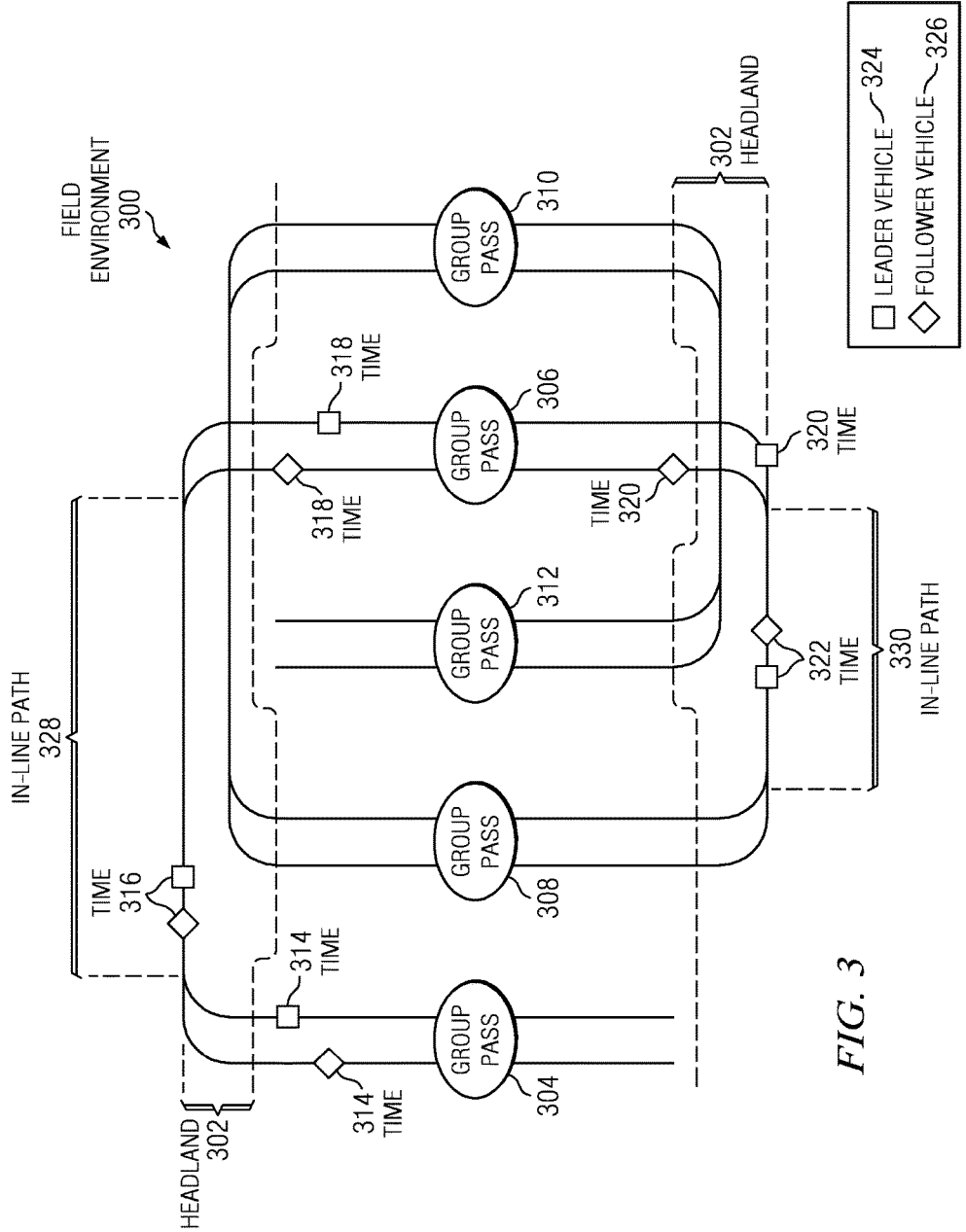
FIG. 3 is a block diagram of one implementation of one illustrative embodiment of a two machine configuration.

Turning now to FIG. 3, a diagram of paths used by two vehicles is depicted in accordance with an illustrative embodiment. In field environment 300, three vehicles make multiple passes on a field while making in-line turns in headland 302. Field environment 300 may be one implementation of one illustrative embodiment of field environment 100 of FIG. 1. In this example, field environment 300 comprises headland 302, group pass 304, 306, 308, 310 and 312, time 314, 316, 318, 320, and 322, leader vehicle 324, and follower vehicle 326.

Headland 302 may be one implementation of headland 112 of FIG. 1. Leader vehicle 324 may be one implementation of combine/harvester 106 of FIG. 1. Follower vehicle 326 may be one implementation of combine/harvester 104 or 108 of FIG. 1.

In one or more illustrative embodiments, follower vehicle 326 is located parallel to, and slightly behind, leader vehicle 324 at time 314 traveling along group pass 304. At time 316, leader vehicle 324 and follower vehicle 326 have entered headland 302 and are located on in-line path 328 created by leader vehicle 324.

At time 318, leader vehicle 324 and follower vehicle 326 have left headland 302 and are now back in parallel paths on group pass 306. At time 320, leader vehicle 324 has entered headland 302. In one or more illustrative embodiments, follower vehicle 326 may have to slow down to allow leader vehicle 324 to pass. In different illustrative embodiments, follower vehicle 326 may maintain a further distance behind leader vehicle 324 so that follower vehicle 326 would not have to slow down for leader vehicle 324 to pass.

At time 322, leader vehicle 324 and follower vehicle 326 have entered headland 302 and are located on in-line path 330 created by leader vehicle 324 heading towards group pass 308, 310, and 312.

The illustration of field environment 100 in FIG. 1 and the machine configurations in FIGS. 2 and 3 are not meant to imply physical or architectural limitations to the manner in which different advantageous embodiments may be implemented. Other components in addition to, and/or in place of the ones illustrated, may be used. Some components may be unnecessary in some advantageous embodiments. Also, the blocks are presented to illustrate some functional components. One or more of these blocks may be combined and/or divided into different blocks when implemented in different advantageous embodiments.

For example, field environments 200 and 300 may have more fields than shown in FIGS. 2 and 3. Also, field environments 200 and 300 may have a different number of vehicles than shown in FIGS. 2 and 3. Also, field environments 200 and 300 may be used for other purposes, such as mine detection, than harvesting as shown in FIGS. 2 and 3. Additionally, a different number of leader vehicles and/or follower vehicles may exist in FIGS. 2 and 3.

Figure 4:
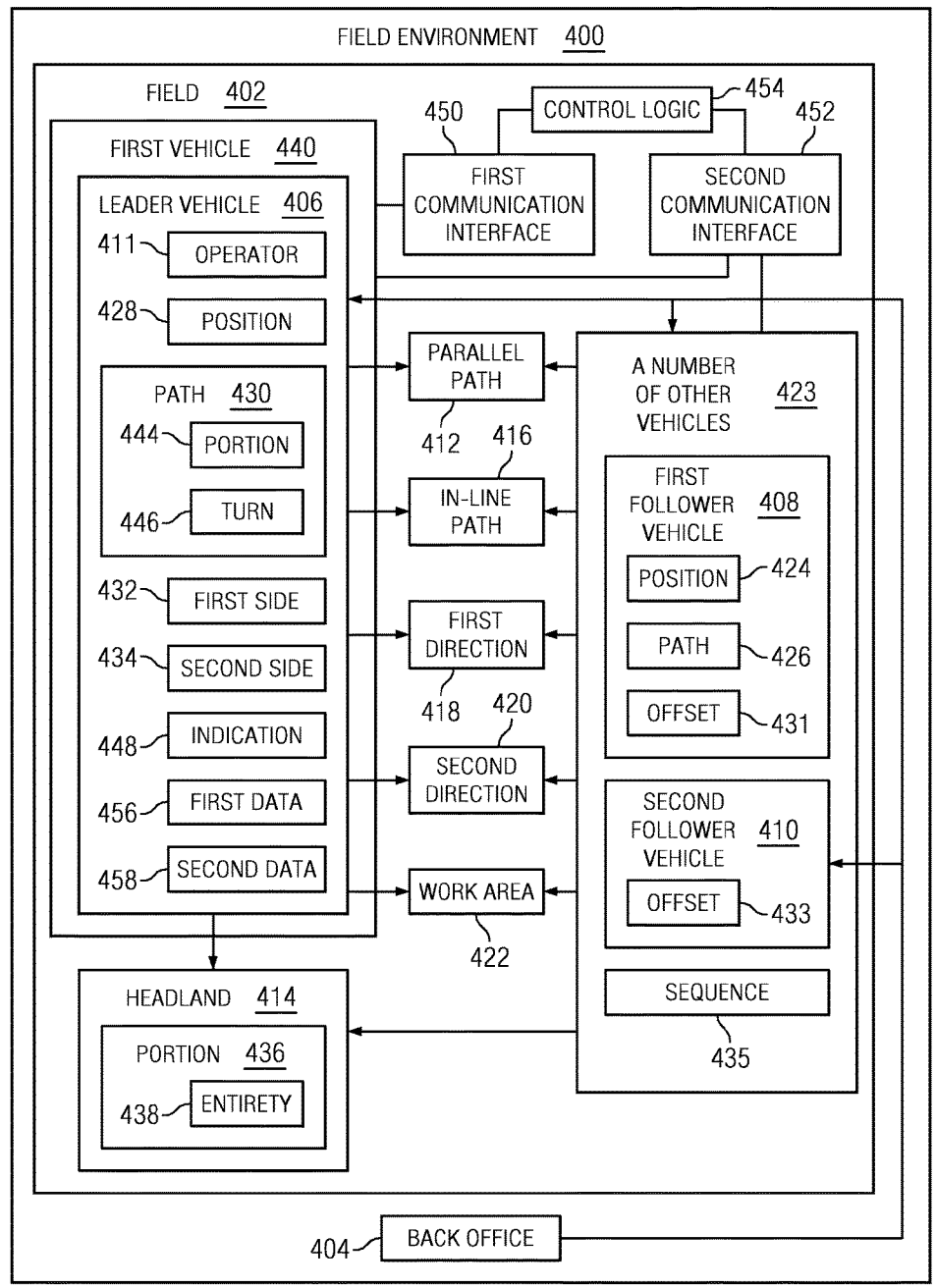
FIG. 4 is a block diagram depicting a field environment in accordance with an illustrative embodiment.

Turning now to FIG. 4, a block diagram is depicted of a field environment in accordance with an illustrative embodiment. Field environment 400 may be a field of crops, military field, or some other type of area. Field environment 400 may be one implementation of one embodiment of field environment 100 of FIG. 1. Field environment 400 may be used for field environment 200 of FIG. 2 and/or field environment 300 of FIG. 3. In different illustrative embodiments, any number of vehicles may be present in the different field environments. For example, a field environment may comprise four, five, six, seven, or more vehicles.

In this example, field environment 400 comprises field 402 and back office 404. Field 402 may comprise leader vehicle 406, first follower vehicle 408, second follower vehicle 410, parallel path 412, headland 414, in-line path 416, first direction 418, second direction 420, and work area 422. Leader vehicle 406 may be first vehicle 440. First follower vehicle 408 and second follower vehicle 410 may together be number of other vehicles 423. Leader vehicle 406 may be one implementation of combine/harvester 106 of FIG. 1, leader vehicle 220 of FIG. 2, or leader vehicle 324 of FIG. 3. First follower vehicle 408 may be one implementation of combine/harvester 104 of FIG. 1, leader vehicle 222 of FIG. 2, or leader vehicle 326 of FIG. 3. Second follower vehicle may be one implementation of combine/harvester 108 of FIG. 1 or leader vehicle 224 of FIG. 2.

Leader vehicle 406, first follower vehicle 408, second follower vehicle 410, and any other vehicle move along field 402 following leader vehicle 406 using a number of different modes of operation to aid operator 411 in performing agricultural tasks on field 402. The modes include, for example, side following mode, teach and playback mode, teleoperation mode, path mapping mode, straight mode, destination point acquisition mode, track and follow mode, path tracking mode, and other suitable modes of operation.

Leader vehicle 406 and follower vehicles 408 and 410 may be any type of vehicle, such as, but not limited to, automobiles, trucks, harvesters, combines, agricultural equipment, tractors, mowers, armored vehicles, and utility vehicles. In addition, the selection of vehicles may be all of the same type, or different type of vehicles may be used for leader vehicle 406, first follower vehicle 408, and follower vehicle 410.

In this example, back office 404 may be one implementation of back office 102 of FIG. 1. Back office 404 may supply knowledge bases to different vehicles, as well as provide online access to information from knowledge bases.

Leader vehicle 406 may be followed by first follower vehicle 408. First follower vehicle 408 may be a similar type of vehicle as leader vehicle 406. First follower vehicle 408 may maintain position 424 and/or path 426 relative to position 428 and path 430 of leader vehicle 406. First follower vehicle 408 may maintain offset 431 relative to leader vehicle 406. Offset 431, or desired offset, may be in the form of a side distance, a distance that the path of first follower vehicle 408 is from path 430 of leader vehicle 406, and a lead distance, the distance leader vehicle 406 is ahead of first follower vehicle 408. For example, if leader vehicle 406 is traveling to point A from point B, first follower vehicle 408 may maintain a path parallel, such as parallel path 412, to leader vehicle 406 and positioned behind leader vehicle 406. Leader vehicle 406, first follower vehicle 408, second follower vehicle 410 may utilize any type of mode of operation. The different modes may include, for example, without limitation, a destination point acquisition mode, a track and follow mode, and a path tracking mode as describe in FIG. 1.

In one or more illustrative embodiments, second follower vehicle 410 also maintains a path parallel to leader vehicle 406 and positioned behind leader vehicle 406. In the embodiments with more than one follower vehicles, the follower vehicles may be evenly placed on either side of leader vehicle 406. For example, first follower vehicle 408 may be placed on first side 432 of leader vehicle 406 and second follower vehicle may be placed on second side 434 of leader vehicle 406. In different illustrative embodiments, more than two follower vehicles may be present.

Field 402 is divided into two types of areas in these examples. The two types of areas are work area 422 and headland 414. Headland 414 is the area in field 402 in which leader vehicle 406 and number of other vehicles 423 perform most of the maneuvering and turning. Work area 422 is every area in field 402 which is not part of headland 414. Headland 414 and work area 422 may or may not be contiguous. There may be multiple areas of headland 414 and work area 422.

For example, leader vehicle 406 may travel in work area 422 in first direction 418 and then turn in headland 414 towards a next group pass where leader vehicle 406 will travel in second direction 420. The headland 414 usually produces less return on crops than work area 422.

When leader vehicle 406 enters portion 436 of headland 414, leader vehicle 406 begins to maneuver to the next group pass across work area 422. Portion 436 may be entirety 438 of headland 414. When first follower vehicle 408 enters headland 414, first follower vehicle 408 may follow in in-line path 416 to leader vehicle 406. First follower vehicle 408 may not immediately be in in-line path 416 upon entering headland 414, but may move towards in-line path 416 upon entering headland 414. Therefore, first follower vehicle 408 may travel on only portion 444 of path 430 during turn 446 of leader vehicle 406.

First follower vehicle 408 may determine in-line path 416 by taking position 428 of leader vehicle 406 during the time in which leader vehicle 406 is in headland 414. Leader vehicle 406 may indicate when leader vehicle 406 is in headland 414 by giving indication 448 and then giving another indication 448 when leader vehicle 406 is out of headland 414. Indication 448 may be generated by operator 411 of leader vehicle 406 by pressing a button or commanding an implement action. In other examples, indication 448 may be generated by leader vehicle 406 automatically when leader vehicle 406 enters and leaves headland 414. First follower vehicle 408 may take data on position 428 of leader vehicle 406 while leader vehicle 406 is in headland 414. In different illustrative embodiments, first follower vehicle 408 may take data points of position 428 of leader vehicle 406 when first follower vehicle 408 knows a priori of where headland 414 beings and ends, for example, when paths 430 and 426 have been preprogrammed.

First follower vehicle 408 may know position 428 of leader vehicle 406 by using a positioning system, such as a global positioning system (GPS). First follower vehicle 408 may get the data on position 428 from leader vehicle 406, first follower vehicle 408, and/or back office 404.

It is recognized that wherever in the illustrative embodiments first follower vehicle 408 is mentioned having a capability, second follower vehicle 410 may also have a similar capability in addition to, or in place of, first follower vehicle 408. Additionally, any number of follower vehicles may perform similar capabilities.

In a number of the illustrative embodiments, when first follower vehicle 408 and second follower vehicle 410 turn in headland 414 from first direction 418 to second direction 420 from one group pass to another group pass, follower vehicles 408 and 410 begin reducing offsets 431 and 433 with path 430 of leader vehicle 406. When first follower vehicle 408 and second follower vehicle 410 enter headland 414, first follower vehicle 408 and second follower vehicle 410 begin reducing offsets 431 and 433 with path 430 of leader vehicle 408. First follower vehicle 408 and second follower vehicle 410 may enter headland 414 in sequence 435. Sequence 435 in which first follower vehicle 408 and second follower vehicle 410 may enter headland 202 may be controlled differently in different illustrative embodiments. Sequence 435 may be controlled utilizing information such as, but not limited to, the timing, spacing, speed, and travel distance to a corresponding offset for leader vehicle 406 of first follower vehicle 408 and second follower vehicle 410. When offsets 431 and 433 are reduced, first follower vehicle 408 and second follower vehicle 410 may be in in-line path 416. Before first follower vehicle 408 and second follower vehicle 410 leave headland 414, first follower vehicle 408 and second follower vehicle 410 begin expanding offsets 431 and 433 to be at the proper distance from path 430 upon leaving headland 414.

In one or more illustrative embodiments, when first follower vehicle 408 and second follower vehicle 410 turn in headland 414 from first direction 418 to second direction 420 from one group pass to another group pass, the follower vehicles switch sides of leader vehicle 406. For example, when entering headland 414, first follower vehicle 408 may be on first side 432 and second follower vehicle may be on second side 434. When exiting headland 414, first follower vehicle 408 may be on second side 434 and second follower vehicle may be on first side 432. By switching sides, each follower vehicle is allowed to make a wider radius turn.

The illustration of field environment 400 in FIG. 4 is not meant to imply physical or architectural limitations to the manner in which different advantageous embodiments may be implemented. Other components in addition to, and/or in place of the ones illustrated, may be used. Some components may be unnecessary in some advantageous embodiments. Also, the blocks are presented to illustrate some functional components. One or more of these blocks may be combined and/or divided into different blocks when implemented in different advantageous embodiments For example, leader vehicle 406 may have more sides than first side 432 and second side 434. Field environment 400 may comprise more follower vehicles than first follower vehicle 408 and second follower vehicle 410. For example, in different illustrative embodiments, field environment 400 may have four follower vehicles. Also, leader vehicles 406, first follower vehicle 408, and second follower vehicle 410 may operate in more directions than just first direction 418 and second direction 420.

Leader vehicle 406 and follower vehicles 408 and 410 may be a group of vehicles in field 402. In different illustrative embodiments, there may be multiple groups of vehicles. The multiple groups of vehicles may operate on the same or different fields. In different embodiments, one of the groups of vehicles may be a leader group of vehicles and the other groups of vehicles may be follower groups of vehicles.

Field environment 400 may also comprise first communication interface 450 and second communication interface 452. First communication interface 450 may be associated with first vehicle 440 and may determine path 430 of first vehicle 440. First communication interface 450 may have both communication ends located at first vehicle 440 or one end may be remote. Path 430 of first vehicle 440 may be determined by components independent from first vehicle 440 such that path 430 is communicated to first vehicle 440 to follow. In other embodiments, first communication interface 450 may determine path 430 that first vehicle 440 is on by receiving input from another control, such as back office 404, that controls path 430 of first vehicle 440 or by receiving feedback as to path 430 being taken by an operator. Second communication interface 452 may be associated with a number of other vehicles 423 and may communicate parallel path 412 that is substantially parallel to, and offset to at least one of first side 432 and second side 434 of first vehicle 440, path 430 of first vehicle 440. Second communication interface 452 may have one communication end located at first vehicle 440 or one end may be remote.

Field environment 400 may also comprise control logic 454. Control logic 454 may signal a number of other vehicles 423 through second communication interface 452 to move along at least portion 444 of path 430 in turn 446 in response to first data 456 indicative of turn 446 in path 430 of first vehicle 440. Control logic 454 may also signal a number of other vehicles 423 through second communication interface 452 to move from path 430 to parallel path 412 that may be substantially parallel to path 430 after turn 446 of first vehicle 440, and offset to an opposite side 432 or 434 than before turn 446 in response to second data 458 indicative of first vehicle 440 completing turn 446. Control logic 454 may also be hosted on first vehicle 440 or remote from first vehicle 440.

Figure 5:
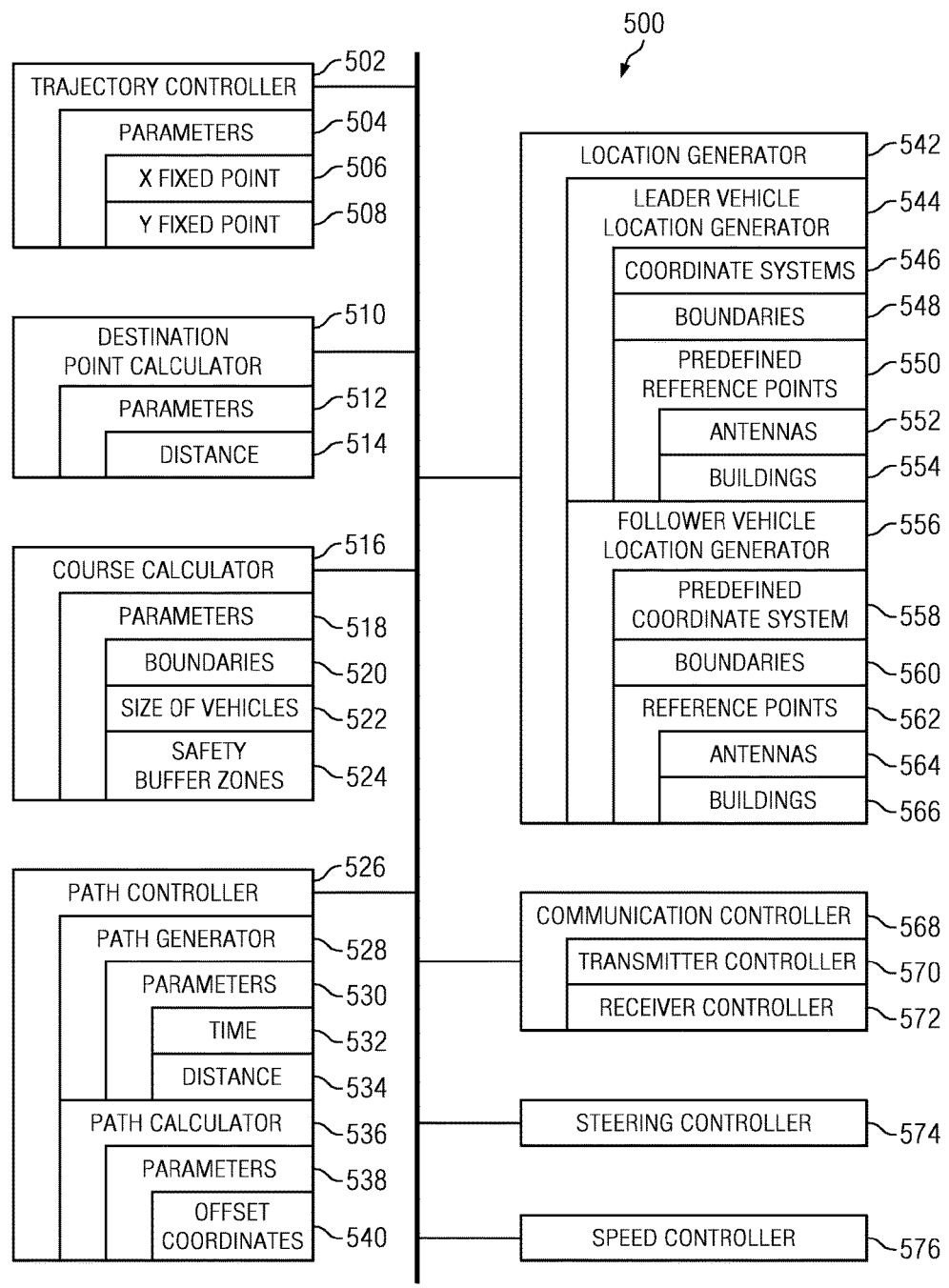
FIG. 5 is a block diagram of one implementation of one illustrative embodiment of a navigation system.

Turning to FIG. 5, a block diagram of one implementation of one illustrative embodiment of a navigation system is depicted. Navigation system 500 may operate in a leader vehicle, a number of other vehicles, or a back office, such as leader vehicle 406, number of other vehicles 423, and back office 404 of FIG. 4. Navigation system 500 may be a data processing system. In different illustrative embodiments, navigation system 500 may be in the form of program code or comprise components which are a data processing system and components which are program code. In one illustrative embodiment, navigation system 500 includes trajectory controller 502 which provides trajectory calculations, adjustments and control. Trajectory controller 502 includes parameters 504 which are utilized in determining a desired trajectory. Parameters 504 include any number of parameters such as, X fixed point 506 and Y fixed point 508 from a given point such as the location of a leader vehicle.

Navigation system 500 includes destination point calculator 510 which is configured to determine a desired destination point based on a given reference point. Destination point calculator 510 includes any number of parameters 512 such as distance 514 which is the distance the destination point is to be from the reference point such as a leader vehicle.

Navigation system 500 includes course calculator 516 which is configured to determine an optimal course from a starting or current position to the desired destination point determined by destination point calculator 510. Course calculator 516 includes parameters 518 such as boundaries 520 which must be avoided, or alternatively must be utilized, size of vehicles 522 operating under navigation system 500, safety buffer zones 524 around vehicles, and other obstacles.

Path controller 526 is also included in navigation system 500 to generate a path or determine a path the vehicle is to follow and the control of the vehicle to maintain travel along the path. In one illustrative embodiment, path controller 526 includes path generator 528 which is configured to generate a leader path based the location of the vehicle. Path generator 528 continuously or periodically generates the path utilizing parameters 530 such as time 532 and distance 534. Path controller 526 further includes path calculator 536 which is configured to utilize a leader path to generate a follower path based on parameters 538 such as predefined or calculated offset coordinates 540. Offset coordinates can be distances to the left, right, front and rear from a leader vehicle or path, distances north, south, east and west of the leader vehicle or path, and other such coordinates.

In one illustrative embodiment, the course calculator 516 and path controllers 526 cooperate to implement a predefined or preprogrammed course allowing the leader and/or follower vehicles to implement a predefined course for automatic operation.

Navigation system 500 further includes location generator 542 which, in one illustrative embodiment, is configured to determine location of any number of vehicles controlled by navigation system 500. Location generator 542 includes at least leader vehicle location generator 544 which utilizes coordinate systems 546, boundaries 548 limiting the operation of the vehicles, predefined reference points 550 such as antennas 552 of the positioning system, buildings 554, and other such reference points. In one illustrative embodiment, the location generator 542 further includes follower vehicle location generator 556 which utilizes similar predefined coordinate systems 558, boundaries 560 limiting the operation of the vehicles, predefined reference points 562 such as antennas 564 of the positioning system, buildings 566, and other such reference points.

In one illustrative embodiment, navigation system 500 further includes communication controller 568 which allows the vehicle to communicate with navigation system 500 and other vehicles. Communication controller 568 includes a transmitter controller 570 and a receiver controller 572.

Navigation system 500 may also include steering controller 574 which is utilized in trajectory, course and path implementation. Navigation system 500 may further include speed controller 576 for controlling the speed of the vehicle.

Navigation system 500 provides for at least three modes of operation and distributed control. A first mode is referred to as a "destination point acquisition" (DPA) mode, a second is referred to as a "track and follow" (TAF) mode, and a third is referred to as a "path tracking" (PT) mode.

Figure 6:
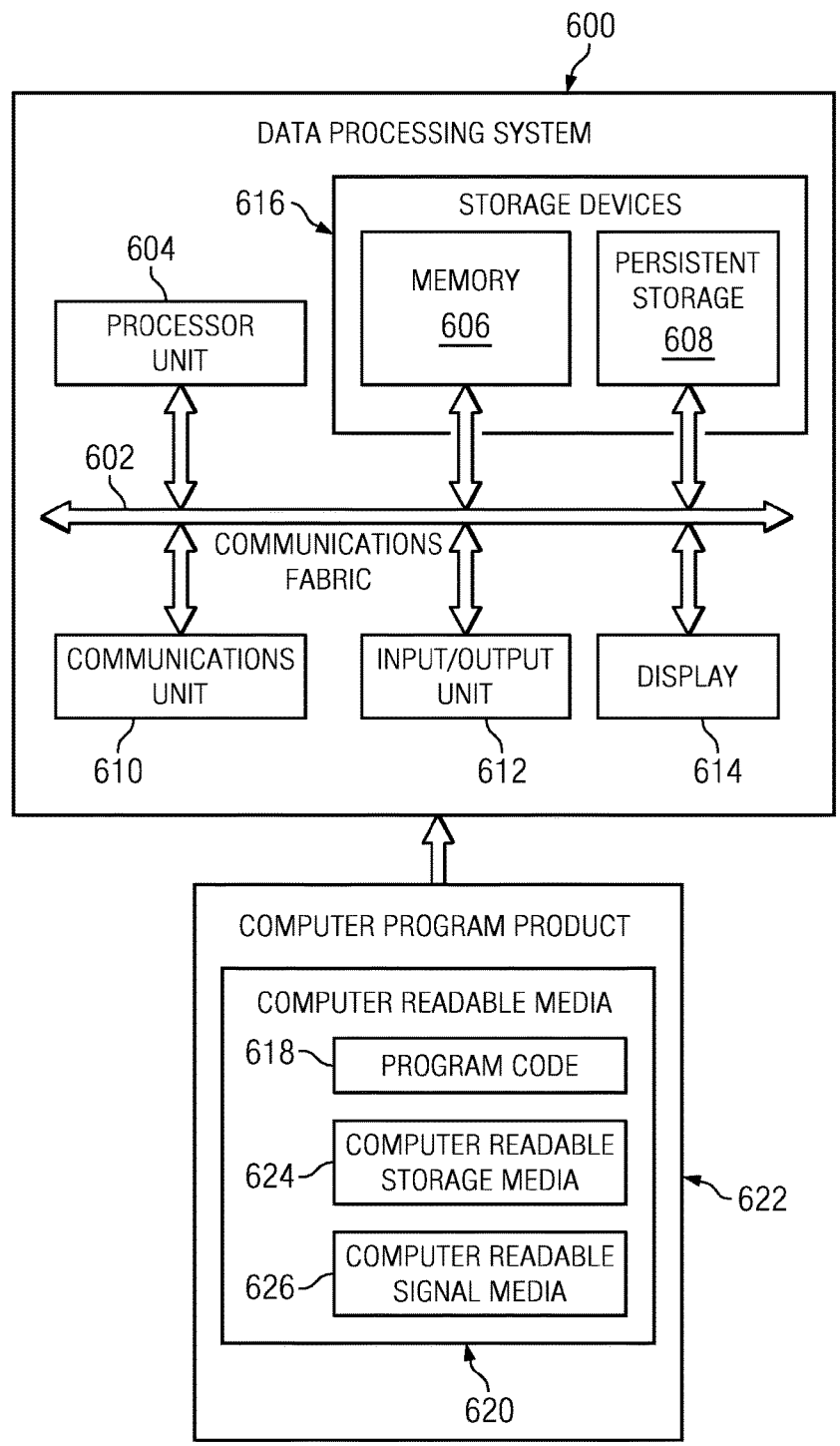
FIG. 6 is a block diagram of a data processing system in accordance with an illustrative embodiment.

Turning now to FIG. 6, a diagram of a data processing system is depicted in accordance with an illustrative embodiment. Data processing system 600 is an example of one manner in which navigation system 500 in FIG. 5 may be implemented.

In this illustrative example, data processing system 600 includes communications fabric 602, which provides communications between processor unit 604, memory 606, persistent storage 608, communications unit 610, input/output (I/O) unit 612, and display 614. Processor unit 604 serves to execute instructions for software that may be loaded into memory 606. Processor unit 604 may be a set of one or more processors or may be a multi-processor core, depending on the particular implementation. Further, processor unit 604 may be implemented using one or more heterogeneous processor systems, in which a main processor is present with secondary processors on a single chip. As another illustrative example, processor unit 604 may be a symmetric multi-processor system containing multiple processors of the same type.

Memory 606 and persistent storage 608 are examples of storage devices 616. A storage device is any piece of hardware that is capable of storing information, such as, for example, without limitation, data, program code in functional form, and/or other suitable information either on a temporary basis and/or a permanent basis. Memory 606, in these examples, may be, for example, a random access memory, or any other suitable volatile or non-volatile storage device. Persistent storage 608 may take various forms, depending on the particular implementation. For example, persistent storage 608 may contain one or more components or devices. For example, persistent storage 608 may be a hard drive, a flash memory, a rewritable optical disk, a rewritable magnetic tape, or some combination of the above. The media used by persistent storage 608 may be removable. For example, a removable hard drive may be used for persistent storage 608.

Communications unit 610, in these examples, provides for communication with other data processing systems or devices. In these examples, communications unit 610 is a network interface card. Communications unit 610 may provide communications through the use of either or both physical and wireless communications links.

Input/output unit 612 allows for the input and output of data with other devices that may be connected to data processing system 600. For example, input/output unit 612 may provide a connection for user input through a keyboard, a mouse, and/or some other suitable input device. Further, input/output unit 612 may send output to a printer. Display 614 provides a mechanism to display information to a user.

Instructions for the operating system, applications, and/or programs may be located in storage devices 616, which are in communication with processor unit 604 through communications fabric 602. In these illustrative examples, the instructions are in a functional form on persistent storage 608. These instructions may be loaded into memory 606 for execution by processor unit 604. The processes of the different embodiments may be performed by processor unit 604 using computer implemented instructions, which may be located in a memory, such as memory 606.

These instructions are referred to as program code, computer usable program code, or computer readable program code that may be read and executed by a processor in processor unit 604. The program code, in the different embodiments, may be embodied on different physical or computer readable storage media, such as memory 606 or persistent storage 608.

Program code 618 is located in a functional form on computer readable media 620 that is selectively removable and may be loaded onto or transferred to data processing system 600 for execution by processor unit 604. Program code 618 and computer readable media 620 form computer program product 622. In one example, computer readable media 620 may be computer readable storage media 624 or computer readable signal media 626. Computer readable storage media 624 may include, for example, an optical or magnetic disc that is inserted or placed into a drive or other device that is part of persistent storage 608 for transfer onto a storage device, such as a hard drive, that is part of persistent storage 608. Computer readable storage media 624 also may take the form of a persistent storage, such as a hard drive, a thumb drive, or a flash memory that is connected to data processing system 600. In some instances, computer readable storage media 624 may not be removable from data processing system 600.

Alternatively, program code 618 may be transferred to data processing system 600 using computer readable signal media 626. Computer readable signal media 626 may be, for example, a propagated data signal containing program code 618. For example, computer readable signal media 626 may be an electro-magnetic signal, an optical signal, and/or any other suitable type of signal. These signals may be transmitted over communication links, such as wireless communication links, an optical fiber cable, a coaxial cable, a wire, and/or any other suitable type of communication link. In other words, the communication link and/or the connection may be physical or wireless in the illustrative examples.

In some illustrative embodiments, program code 618 may be downloaded over a network to persistent storage 608 from another device or data processing system through computer readable signal media 626 for use within data processing system 600. For instance, program code stored in a computer readable storage media in a server data processing system may be downloaded over a network from the server to data processing system 600. The data processing system providing program code 618 may be a server computer, a client computer, or some other device capable of storing and transmitting program code 618.

The different components illustrated for data processing system 600 are not meant to provide architectural limitations to the manner in which different embodiments may be implemented. The different illustrative embodiments may be implemented in a data processing system including components in addition to, or in place of, those illustrated for data processing system 600. Other components shown in FIG. 6 can be varied from the illustrative examples shown. The different embodiments may be implemented using any hardware device or system capable of executing program code. As one example, data processing system 600 may include organic components integrated with inorganic components and/or may be comprised entirely of organic components excluding a human being. For example, a storage device may be comprised of an organic semiconductor.

As another example, a storage device in data processing system 600 is any hardware apparatus that may store data. Memory 606, persistent storage 608, and computer readable media 620 are examples of storage devices in a tangible form.

In another example, a bus system may be used to implement communications fabric 602 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 606 or a cache such as found in an interface and memory controller hub that may be present in communications fabric 602.

Figure 7:
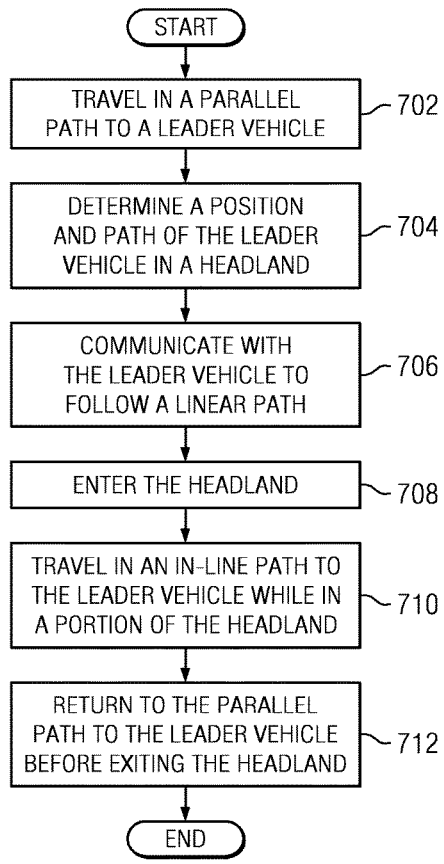
FIG. 7 is a flowchart of a process for following a leader vehicle in accordance with an illustrative embodiment.

Turning now to FIG. 7, a flowchart is depicted for a process for following a leader vehicle in accordance with an illustrative embodiment. The process in FIG. 7 may be implemented in field environment 200 of FIG. 2.

The process begins with a follower vehicle traveling in a parallel path to the leader vehicle (step 702). The follower vehicle determines a position and path of the leader vehicle in a headland (step 704). The position and path may be sent from the leader vehicle to the follower vehicles or received from a back office. The position and path may be determined by indications from the leader vehicle when the headland was entered and left. Next, the follower vehicle communicates with the leader vehicle to follow an in-line path in a portion of the headland (step 706).

Then, the follower vehicle enters the headland (step 708). The process controls the sequence of the follower vehicles along the portion of the path in the turn. The sequence in which the follower vehicles may enter the headland may be determined differently in different illustrative embodiments. The sequence may be controlled utilizing information such as, but not limited to, the timing, spacing, speed, and travel distance to a corresponding offset, for a leader vehicle, of the follower vehicles. Next, the follower vehicle travels in-line with the leader vehicle while in a portion of the headland (step 710). The portion of the headland may be the entirety of the headland. Next, the follower vehicle returns to the parallel path to the leader vehicle before exiting the headland (step 712). Thereafter, the process returns to step 702. It is appreciated that any number of conditions may cause the process to be interrupted or stopped. For example, the process may end if the vehicles complete a mission, finish harvesting a field, or there are no more headlands remaining.

Figure 8:
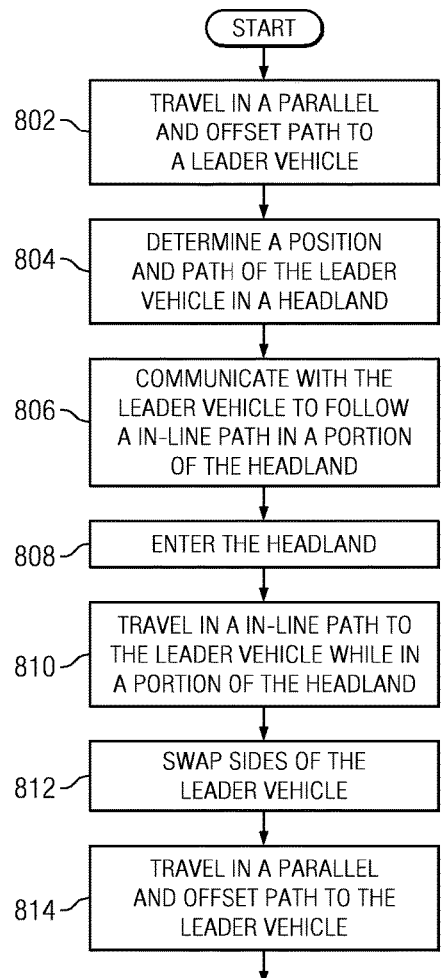
FIG. 8 is a flowchart of a process for switching sides of a leader vehicle in accordance with an illustrative embodiment.

Turning now to FIG. 8, a flowchart is depicted for a process for switching sides of a leader vehicle in accordance with an illustrative embodiment. The process in FIG. 8 may be implemented in field environment 200 of FIG. 2.

The process beings with a follower vehicle traveling in a parallel and offset path to the leader vehicle (step 802). The first follower vehicle moves on a first parallel path on a first side of the path of the leader vehicle. The second follower vehicle moves on a second parallel path on a second side of the path of the leader vehicle. The follower vehicle and a second follower vehicle follow the leader vehicle in parallel paths on a first side and a second side of the leader vehicle, respectively, in a first direction. The follower vehicle determines a position and path of the leader vehicle in a headland (step 804). The follower vehicle communicates with the leader vehicle to follow an in-line path in a portion of the headland (step 806).

Then, the follower vehicle enters the headland (step 808). Next, the follower vehicle travels in in-line with the leader vehicle while in the portion of the headland (step 810). The portion of the headland may be the entirety of the headland. The follower vehicle and second follower vehicle swap sides once exited from the headland and travel in a second direction (step 812). The follower vehicle and the second follower vehicle travel in a parallel and offset path from the leader vehicle (step 814). The first follower vehicle moves from the path to the second parallel path in response to the leader vehicle ending the turn. The second follower vehicle moves from the path to the first parallel path in response to the leader vehicle ending the turn. The first follower vehicle and the second follower vehicle swap sides relative to the path of the leader vehicle. The follower vehicle and the second follower vehicle follow the leader vehicle in parallel paths on the second side and the first side of the leader vehicle, respectively, in the second direction. Thereafter, the process terminates.

Figure 9:
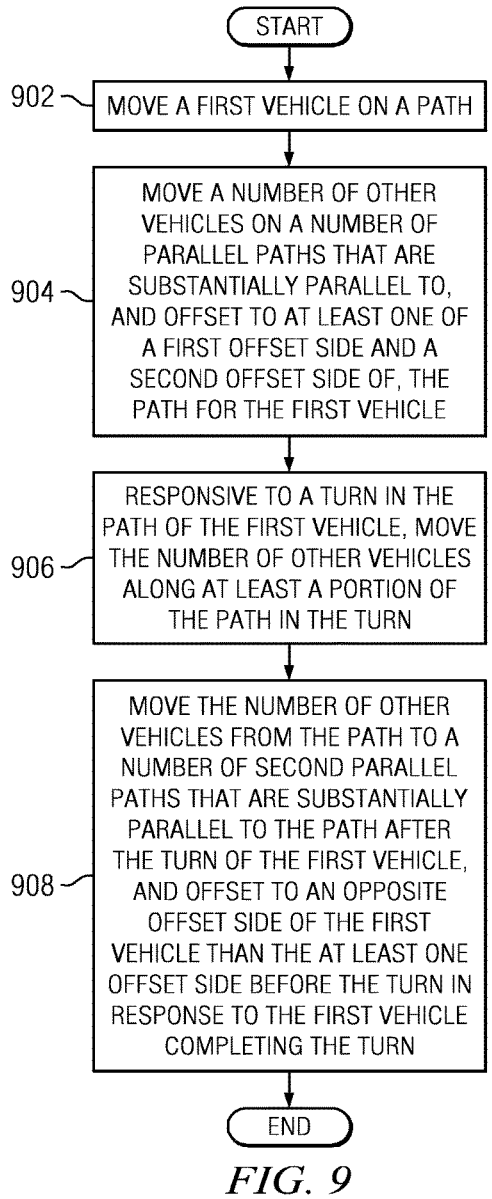
FIG. 9 is a flowchart of a process for controlling movement of vehicles in accordance with an illustrative embodiment.

Turning now to FIG. 9, a flowchart is depicted for controlling movement of vehicles in accordance with an illustrative embodiment. The process in FIG. 9 may be implemented in field environment 200 of FIG. 2.

The process moves a first vehicle on a path (step 902). Then, the process moves a number of other vehicles on a number of parallel paths that are substantially parallel to, and offset to at least one of a first offset side and a second offset side of, the path for the first vehicle (step 904). Then, the process moves the number of other vehicles along at least a portion of the path in the turn in response to a turn in the path of the first vehicle (step 906). Next, the process moves the number of other vehicles from the path to a number of second parallel paths that are substantially parallel to the path after the turn of the first vehicle, and offset to an opposite offset side of the first vehicle than the at least one offset side before the turn in response to the first vehicle completing the turn (step 908). Thereafter, the process terminates.

Figure 10:
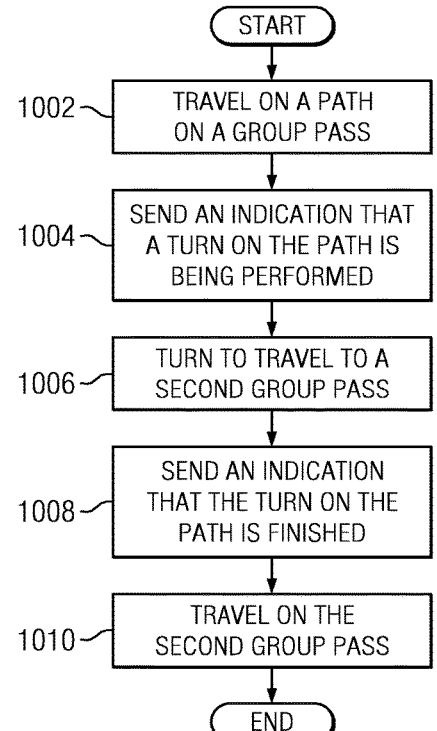
FIG. 10 is a flowchart of a process for a leader vehicle movement in accordance with an illustrative embodiment.

Turning now to FIG. 10, a flowchart is depicted for a process for leader vehicle movement in accordance with an illustrative embodiment. The process in FIG. 10 may be implemented in field environment 200 of FIG. 2.

The process beings with a leader vehicle traveling on a path on a group pass (step 1002). The leader vehicle sends out an indication that a turn on the path is being performed (step 1004). The leader vehicle turns to travel to a second group pass (step 1006). The turn may be entirely made in a headland. The leader vehicle sends an indication that the turn on the path is finished (step 1008). Next, the leader vehicle travels on the second group pass (step 1010). Thereafter, the process terminates.

Figure 11:
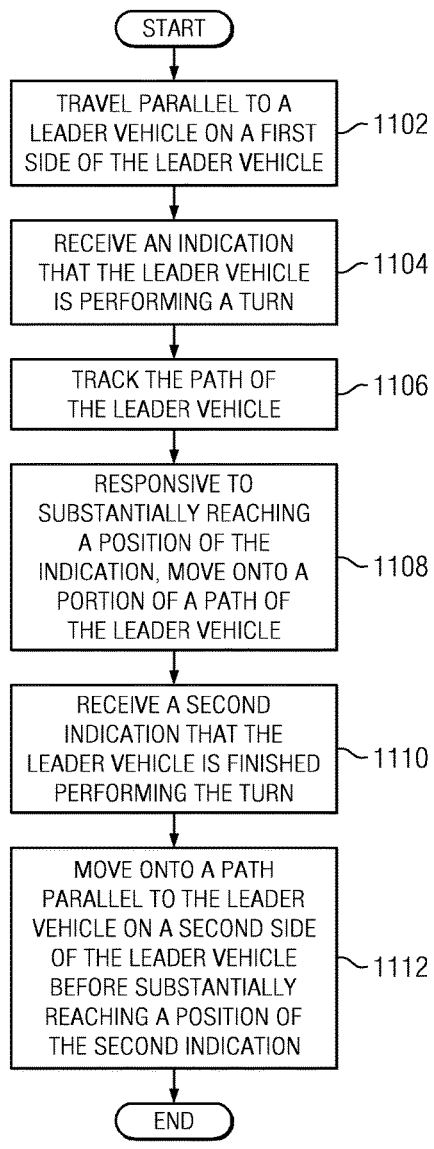
FIG. 11 is a flowchart of a process for follower vehicle movement in accordance with an illustrative embodiment.

Turning now to FIG. 11, a flowchart is depicted for a process for follower vehicle movement in accordance with an illustrative embodiment. The process in FIG. 11 may be implemented in field environment 200 of FIG. 2.

The process begins with a follower vehicle traveling parallel to a leader vehicle on a first side of the leader vehicle (step 1102). The follower vehicle receives an indication that the leader vehicle is performing a turn (step 1104). The follower vehicle tracks the path of the leader vehicle (step 1106). Then, responsive to substantially reaching a position of the indication, moving onto a portion of a path of the leader vehicle (step 1108). The position of the indication may be the start of a headland. The follower vehicle may not begin to move towards the path until inside of the headland.

The follower vehicle receives a second indication that the leader vehicle is finished performing the turn (step 1110). The second indication may be in conjunction with leaving the headland. The follower vehicle moves back into a parallel path to the leader vehicle on a second side of the leader vehicle before substantially reaching a position of the second indication (step 1112). The second side of the leader vehicle may be the opposite side from the first side. Also, while switching sides, the follower vehicle may skip rows. The follower vehicle may skip a number of rows equal to the number of follower vehicles. Also, the follower vehicle may get into the parallel path before substantially reaching a position of the second indication which also may be the same as the exit of the headland. Thereafter, the process terminates.

Figure 12:
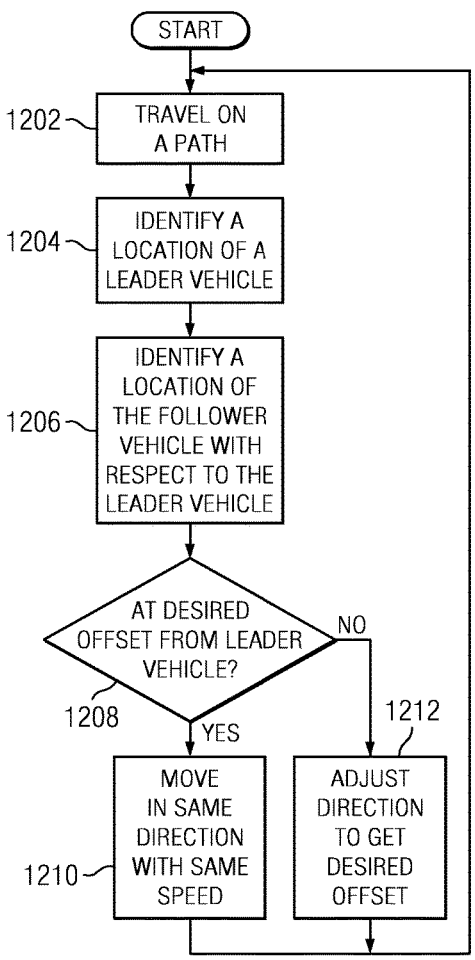
FIG. 12 is a flowchart of a process for identifying a headland in accordance with an illustrative embodiment.

Turning now to FIG. 12, a flowchart is depicted for a process for follower vehicle movement in accordance with an illustrative embodiment. The process in FIG. 12 may be implemented in field environment 200 of FIG. 2.

The process begins with the follower vehicle traveling on a path (step 1202). The follower vehicle identifies a location of a leader vehicle (step 1204). Then, the follower vehicle identifies a location of the follower vehicle with respect to the leader vehicle (step 1206). A determination is made as to whether the follower vehicle is at a desired offset from the leader vehicle (step 1208). The determination may be made by the leader vehicle. In different embodiments, the follower vehicle, another vehicle, or a back office may make the determination. The desired offset may be in the form of a side distance, a distance that the path of the follower vehicle is from the path of the leader vehicle, and a lead distance, the distance the leader vehicle is ahead of the follower vehicle. If the follower vehicle is at the desired offset from the leader vehicle, the follower vehicle continues to move in the same direction with the same speed (step 1210). Thereafter, the process returns to step 1202. If the follower vehicle is not at the desired offset from the leader vehicle, the follower vehicle adjusts direction to get to the desired offset (step 1212). Thereafter, the process returns to step 1202. It is appreciated that any number of conditions may cause the process to be interrupted or stopped. For example, the process may end if the vehicles complete a mission or finish harvesting a field.

Turning now to FIG. 13, a flowchart is depicted for a process for identifying a headland in accordance with an illustrative embodiment. The process in FIG. 13 may be implemented in field environment 200 of FIG. 2.

The process begins with a determination whether an indication has been received that a leader vehicle is entering the headland (step 1302). If the indication is not received, the process returns to step 1302. If the indication is received, then a location of the leader vehicle is identified (step 1304). Then, a second determination is made whether a second indication has been received that the leader vehicle is leaving the headland (step 1306). If the second indication is not received, the process returns to step 1304. If the second indication is received, then a second location of the leader vehicle is identified (step 1308). Thereafter, the process returns to step 1302 to identify the next headland. It is appreciated that any number of conditions may cause the process to be interrupted or stopped. For example, the process may end if the vehicles complete a mission, finish harvesting a field, or there are no more headlands remaining.

Turning now to FIG. 14 a flowchart is depicted for a process for managing follower vehicle movement in accordance with an illustrative embodiment. The process in FIG. 14 may be implemented in field environment 200 of FIG. 2.

The process beings with a determination whether a leader vehicle is in a work area (step 1402). If the leader vehicle is in the work area, set an offset to travel on a path parallel to the leader vehicle (step 1404), then the process repeats step 1402. If the leader vehicle is not in the work area, determine whether the follower vehicle is in a headland (step 1406). If the follower vehicle is not in the headland, the follower vehicle moves in the same direction (step 1408), then repeats step 1406. If the follower vehicle has entered the headland, the follower vehicle changes an offset from the leader vehicle to travel on a path traveled by the leader vehicle (step 1410). Then, a second determination is made as to whether the follower vehicle is ready to exit the headland (step 1412). If the follower vehicle is not ready to exit the headland, the process repeats step (1412). If the follower vehicle is ready to exit the headland, the follower vehicle changes the offset to travel in a path parallel to the leader vehicle and on an opposite side of the leader vehicle than in step 1404 (step 1414). The follower vehicle is ready to exit the headland when the follower vehicle has a distance left before the end of the headland to change the offset to travel in the path parallel to the leader vehicle before the follower vehicle exits the headland. When the follower vehicle travels on an opposite side of the leader vehicle, the follower vehicle and leader vehicle are skipping rows or paths. Thereafter, the process terminates.

The flowcharts and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The illustrative embodiments also recognize that in order to provide a system and method where an operator may safely and naturally interact with a combination manned/autonomous vehicle, specific mechanical accommodations for intuitive operator use of mode switching systems is required. Therefore, it would be advantageous to have a method and apparatus to provide additional features for autonomous operation of vehicles.

The description of the different advantageous embodiments has been presented for purposes of illustration and description, and is not intended to be exhaustive or limited to the embodiments in the form disclosed. Many modifications and variations will be apparent to those of ordinary skill in the art. Further, different embodiments may provide different advantages as compared to other embodiments. The embodiment or embodiments selected are chosen and described in order to best explain the principles of the disclosure, the practical application, and to enable others of ordinary skill in the art to understand the invention for various embodiments with various modifications as are suited to the particular use contemplated.

What is claimed is:

1. A method for controlling movement of vehicles, the method comprising:

moving a first vehicle on a path using a data processing system;

moving a number of other vehicles on a number of parallel paths that are substantially parallel to, and offset to at least one of a first offset side and a second offset side of the path for the first vehicle;

responsive to receiving from the first vehicle an indication to follow the path of the first vehicle, moving the number of other vehicles onto, and travelling linearly along, the path for the first vehicle in a turn in the path of the first vehicle; and responsive to receiving from the first vehicle another indication of the first vehicle completing the turn, moving the number of other vehicles from the path for the first vehicle to a number of second parallel paths that are substantially parallel to the path for the first vehicle after the turn of the first vehicle and offset to an opposite offset side of the first vehicle from a perspective of the first vehicle than the at least one offset side before the turn, wherein at least one of the number of other vehicles is on an opposite side of the first vehicle than the other number of other vehicles before the turn and after the turn such that each one of the number of other vehicles skips a number of rows in the turn, where the number of rows that are skipped in the turn is equal to the number of other vehicles, and wherein the number of other vehicles are a plurality of other vehicles, and further comprising:

controlling a sequence of each of the plurality of other vehicles onto the path in the turn by controlling a speed and spacing of each of the plurality of other vehicles onto the path in the turn.

2. A method for controlling movement of vehicles, the method comprising:

moving a first vehicle on a path using a data processing system;

moving a number of other vehicles on a number of parallel paths that are substantially parallel to, and offset to at least one of a first offset side and a second offset side of the path for the first vehicle, wherein the number of other vehicles are a plurality of other vehicles;

responsive to receiving from the first vehicle an indication to follow the path of the first vehicle, moving the number of other vehicles onto, and travelling linearly along, the path for the first vehicle in a turn in the path of the first vehicle, including moving a first follower vehicle onto the path, wherein a speed of a second follower vehicle is adjusted to allow the first follower vehicle to move onto the path behind the first vehicle to linearly travel in-line behind the first vehicle and along at least a portion of the path of the first vehicle; and responsive to receiving from the first vehicle another indication of the first vehicle completing the turn, moving the number of other vehicles from the path for the first vehicle to a number of second parallel paths that are substantially parallel to the path for the first vehicle after the turn of the first vehicle and offset to an opposite offset side of the first vehicle from a perspective of the first vehicle than the at least one offset side before the turn, wherein the portion of the path is in a headland in a field, wherein the second follower vehicle is moved onto the path in a different location from the first follower vehicle based on an offset with the path that is decreased when the second follower vehicle enters the headland and is increased when the second follower vehicle leaves the headland.

3. A method for controlling movement of vehicles, the method comprising:

moving a first vehicle on a path using a data processing system;

moving a number of other vehicles on a number of parallel paths that are substantially parallel to, and offset to at least one of a first offset side and a second offset side of the path for the first vehicle, wherein the number of other vehicles are a plurality of other vehicles;

responsive to receiving from the first vehicle an indication to follow the path of the first vehicle, moving the number of other vehicles onto, and travelling linearly along, the path for the first vehicle in a turn in the path of the first vehicle; and responsive to receiving from the first vehicle another indication of the first vehicle completing the turn, moving the number of other vehicles from the path for the first vehicle to a number of second parallel paths that are substantially parallel to the path for the first vehicle after the turn of the first vehicle and offset to an opposite offset side of the first vehicle from a perspective of the first vehicle than the at least one offset side before the turn, wherein the number of parallel paths are in a work area of a field, wherein a group pass is a group path of the first vehicle and the number of other vehicles from one side of the field to another side of the field, and further comprising:

skipping, by the first vehicle, the group pass located between the number of parallel paths and the number of second parallel paths.

4. A method for controlling movement of vehicles, the method comprising:

moving a first vehicle on a path using a data processing system;

sending, by a communication interface of the first vehicle, a position of the first vehicle and the path of the first vehicle to a number of other vehicles;

moving a number of other vehicles on a number of paths that are substantially parallel to the path for the first vehicle;

sending, by the communication interface of the first vehicle, an indication to follow the path of the first vehicle on at least the portion of the path of the first vehicle in the turn; and responsive to a turn in the path of the first vehicle, moving the number of other vehicles onto the at least a portion of the path of the first vehicle in the turn;

wherein the first vehicle is a leader vehicle and wherein the number of vehicles comprises a first follower vehicle and a second follower vehicle and wherein the step of moving a number of other vehicles in a number of paths that are substantially parallel to the path for the first vehicle comprises:

moving the first follower vehicle on a first parallel path on a first side of the path of the leader vehicle;

moving the second follower vehicle on a second parallel path on a second side of the path of the leader vehicle;

wherein the step of moving the number of other vehicles onto the at least a portion of the path of the first vehicle in the turn comprises:

moving the first follower vehicle from the first parallel path onto the path; and moving the second follower vehicle from the second parallel path onto the path after the first follower vehicle has moved onto the path;

wherein the second follower vehicle moves onto the path in a different location from the first follower vehicle; and wherein the portion of the path is in a headland in the field, wherein the second follower vehicle is moved onto the path in the different location from the first follower vehicle based on an offset with the path that is decreased when the second follower vehicle enters the headland and is increased when the second follower vehicle leaves the headland.

5. A method for controlling movement of vehicles, the method comprising:

moving a first vehicle on a path using a data processing system;

sending, by a communication interface of the first vehicle, a position of the first vehicle and the path of the first vehicle to a number of other vehicles;

moving a number of other vehicles on a number of paths that are substantially parallel to the path for the first vehicle;

sending, by the communication interface of the first vehicle, an indication to follow the path of the first vehicle on at least the portion of the path of the first vehicle in the turn; and responsive to a turn in the path of the first vehicle, moving the number of other vehicles onto the at least a portion of the path of the first vehicle in the turn, wherein the number of parallel paths are in a work area of the field, wherein a group pass is a group path of the first vehicle and the number of other vehicles from one side of the field to another side of the field, and further comprising:

skipping, by the first vehicle, the group pass located between the number of parallel paths and the number of second parallel paths.

6. The method of claim 2, further comprising:

sending, by a communication interface of the first vehicle, an order to enter the headland to each of the number of other vehicles.

* * * * *